United States Patent
Yang et al.

(10) Patent No.: US 9,516,653 B2
(45) Date of Patent: Dec. 6, 2016

(54) SCHEDULING METHOD FOR DEVICE-TO-DEVICE COMMUNICATION AND APPARATUS FOR SAME

(71) Applicant: LG ELECTRONICS INC., Seoul (KR)

(72) Inventors: Suckchel Yang, Anyang-si (KR); Joonkui Ahn, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/407,003

(22) PCT Filed: Jun. 24, 2013

(86) PCT No.: PCT/KR2013/005565
§ 371 (c)(1),
(2) Date: Dec. 10, 2014

(87) PCT Pub. No.: WO2013/191522
PCT Pub. Date: Dec. 27, 2013

(65) Prior Publication Data
US 2015/0181587 A1 Jun. 25, 2015

Related U.S. Application Data

(60) Provisional application No. 61/662,922, filed on Jun. 22, 2012.

(51) Int. Cl.
*H04W 4/00* (2009.01)
*H04W 72/04* (2009.01)
(Continued)

(52) U.S. Cl.
CPC .......... *H04W 72/048* (2013.01); *H04L 1/0061* (2013.01); *H04L 1/1861* (2013.01);
(Continued)

(58) Field of Classification Search
CPC .... H04W 72/048; H04L 1/0061; H04L 1/1861
See application file for complete search history.

(56) References Cited

U.S. PATENT DOCUMENTS

2010/0107028 A1 4/2010 Gorokhov et al.
2010/0275083 A1 10/2010 Nam et al.
(Continued)

FOREIGN PATENT DOCUMENTS

KR 10-2009-0062435 A 6/2009
KR 10-2011-0121673 A 11/2011
(Continued)

*Primary Examiner* — Abdelnabi Musa
(74) *Attorney, Agent, or Firm* — Birch, Stewart, Kolasch & Birch, LLP

(57) ABSTRACT

The present invention relates to a wireless communication system. More particularly, the present invention relates to a method for transmitting device-to-device (D2D) data and an apparatus therefor, the method comprising the steps of: receiving, from a base station, control information which includes a first resource allocation information item; transmitting, to a second terminal, a second physical downlink control channel (PDCCH) signal which includes a second resource allocation information item, while including the resource indicated by the second resource allocation information item in the resource indicated by the first allocation information item; and transmitting the D2D data to the second terminal by using the resource indicated by the second resource allocation information item.

10 Claims, 13 Drawing Sheets

(51) Int. Cl.
  *H04L 1/18* (2006.01)
  *H04L 1/00* (2006.01)
  *H04L 5/00* (2006.01)
  *H04W 72/12* (2009.01)
  *H04W 92/18* (2009.01)

(52) U.S. Cl.
  CPC ......... *H04L 5/0007* (2013.01); *H04W 72/042* (2013.01); *H04W 72/12* (2013.01); *H04W 92/18* (2013.01)

(56) References Cited

U.S. PATENT DOCUMENTS

| | | | |
|---|---|---|---|
| 2011/0268004 A1* | 11/2011 | Doppler | H04W 72/02 370/311 |
| 2011/0299452 A1 | 12/2011 | Seo et al. | |
| 2012/0083283 A1* | 4/2012 | Phan | H04W 72/048 455/450 |
| 2012/0129540 A1* | 5/2012 | Hakola | H04W 72/042 455/450 |
| 2012/0134305 A1 | 5/2012 | Damnjanovic et al. | |
| 2012/0140724 A1 | 6/2012 | Sipola et al. | |
| 2013/0005377 A1* | 1/2013 | Wang | H04W 72/0406 455/509 |
| 2013/0058317 A1 | 3/2013 | Park et al. | |
| 2013/0064146 A1 | 3/2013 | Ahn et al. | |
| 2013/0142268 A1 | 6/2013 | Gao et al. | |
| 2013/0223353 A1 | 8/2013 | Liu et al. | |
| 2013/0223356 A1* | 8/2013 | Khoshnevis | H04W 72/042 370/329 |
| 2014/0018010 A1* | 1/2014 | Gao | H04W 76/023 455/67.13 |

FOREIGN PATENT DOCUMENTS

| | | |
|---|---|---|
| KR | 10-2011-0127080 A | 11/2011 |
| KR | 10-2012-0057573 A | 6/2012 |
| WO | WO 2011/145884 A2 | 11/2011 |

* cited by examiner (a) Normal CP (b) Extended CP

FIG. 12
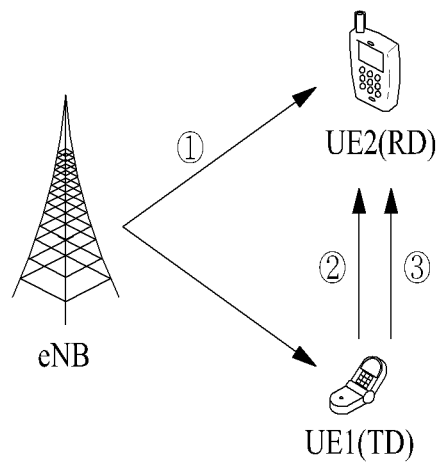
(a)
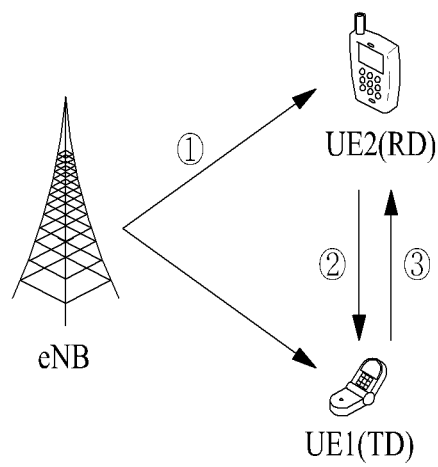
(b)

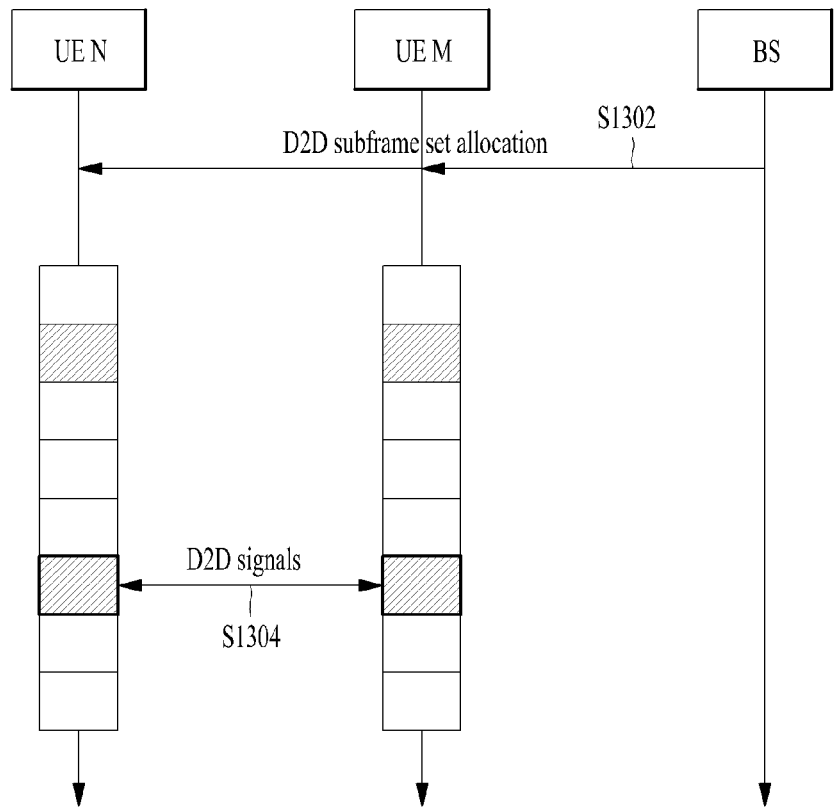

SCHEDULING METHOD FOR DEVICE-TO-DEVICE COMMUNICATION AND APPARATUS FOR SAME

CROSS REFERENCE TO RELATED APPLICATIONS

This application is the National Phase of PCT/KR2013/005565 filed on Jun. 24, 2013, which claims priority under 35 U.S.C. 119(e) to U.S. Provisional Application No. 61/662,922 filed on Jun. 22, 2012, all of which are hereby expressly incorporated by reference into the present application.

TECHNICAL FIELD

The present invention relates to a wireless communication method, and more particularly, to a scheduling method and apparatus for device-to-device (D2D) communication.

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA), etc.

DISCLOSURE

Technical Problem

An object of the present invention devised to solve the problem lies in a method and apparatus for effectively transmitting control information in a wireless communication system. Another object of the present invention devised to solve the problem lies in a method and apparatus for effectively transmitting control information in a system for supporting user equipment (UE)-UE link and effectively managing resources for the effective transmission.

It is to be understood that both the foregoing general description and the following detailed description of the present invention are exemplary and explanatory and are intended to provide further explanation of the invention as claimed.

Technical Solution

The object of the present invention can be achieved by providing a method for transmitting Device-to-Device (D2D) data by a first user equipment (UE) in a wireless communication system, the method comprising: receiving control information including first resource allocation information from a base station; transmitting a second Physical Downlink Control Channel (PDCCH) signal including second resource allocation information to a second UE, wherein a resource indicated by the second resource allocation information is included a resource indicated by the first resource allocation information; and transmitting the D2D data to the second UE using the resource indicated by the second resource allocation information.

In another aspect of the present invention, provided herein is a first user equipment (UE) configured to perform Device-to-Device (D2D) operations in a wireless communication system, the first UE including a radio frequency (RF) unit and a processor, wherein the processor is configured to receive control information including first resource allocation information from a base station, to transmit a second Physical Downlink Control Channel (PDCCH) signal including second resource allocation information to a second UE, wherein a resource indicated by the second resource allocation information is included a resource indicated by the first resource allocation information, and to transmit the D2D data to the second UE using the resource indicated by the second resource allocation information.

The first resource allocation information may be included in a first PDCCH signal, and a Cyclic Redundancy Check (CRC) of the first PDCCH signal may be scrambled with a common Radio Network Temporary Identifier (RNTI) for D2D.

The first resource allocation information may be included in a Physical Downlink Shared Channel (PDSCH) signal, and the PDSCH may include identification information for a plurality of D2D UEs and a plurality of resource allocation information corresponding to the plurality of D2D UEs.

The resource indicated by the second resource allocation information may be allocated on assumption that the resource indicated by the first resource allocation is an entire resource for D2D communication.

The first resource allocation may indicate a plurality of frequency resources indexes, and the plurality of frequency resources indexes are renumbered for the second resource allocation information.

A field size of the second resource allocation information may be smaller than a field size of the first resource allocation information.

Advantageous Effects

According to the present invention, control information can be effectively transmitted in a wireless communication system. In detail, in a system for supporting device-to-device (D2D) communication, scheduling information can be effectively transmitted and resources for the transmission can be effectively managed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIGS. 12 to 14 illustrate a procedure for performing D2D communication according to the present invention.

BEST MODE

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the present invention will be described in terms of 3GPP LTE/LTE-A, but is not limited thereto. Specific terms used in the embodiments of the present invention are provided to aid in the understanding of the present invention. These specific terms may be replaced with other terms within the scope and spirit of the present invention.

In a wireless communication system, a UE receives information from an eNB through downlink (DL) and transmits information to the eNB through uplink (UL). Information transmitted/received between the UE and eNB includes data and various types of control information, and various physical channels are present according to type/purpose of information transmitted/received between the UE and eNB.

Figure 1:
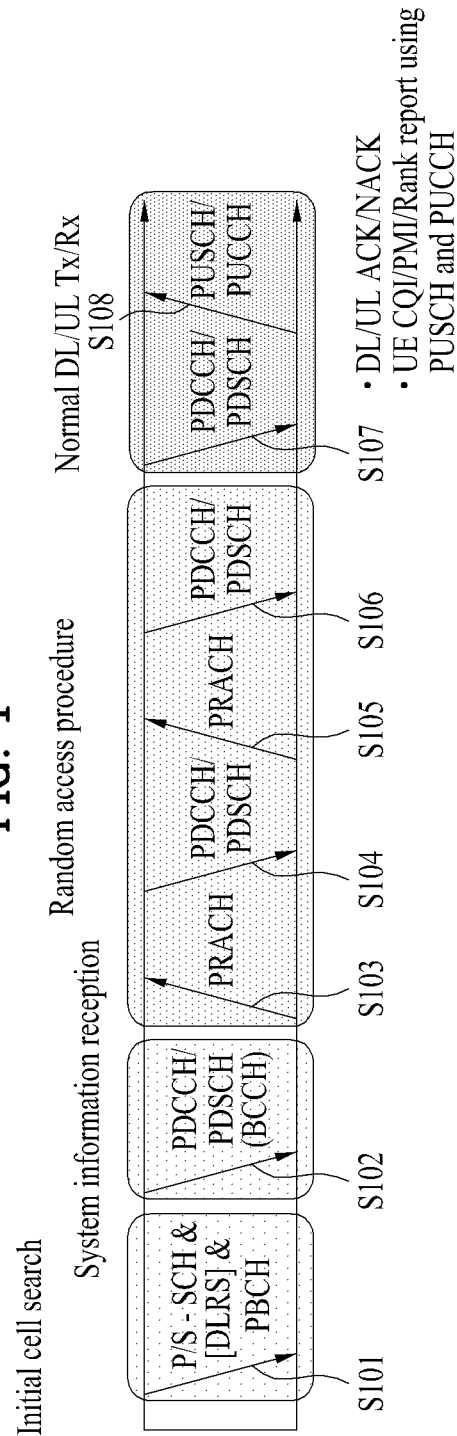
FIG. 1 is a diagram showing physical channels used in a 3GPP LTE(-A) system and a general signal transmission method using the same.

FIG. 1 is a diagram showing physical channels used in a 3GPP LTE(-A) system and a general signal transmission method using the same.

When a UE is powered on or enters a new cell, the UE performs an initial cell search operation such as synchronization with an eNB in step S101. To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information in step S102.

When the UE initially accesses the eNB or has no radio resources for signal transmission, the UE may perform a random access procedure (RACH) with respect to the eNB in steps S103 to S106. To this end, the UE may transmit a specific sequence as a preamble through a physical random access channel (PRACH) (S103) and receive a response message to the preamble through the PDCCH and the PDSCH corresponding thereto (S104). In the case of contention-based RACH, the UE may perform a contention resolution procedure by further transmitting the PRACH (S105) and receiving a PDCCH and a PDSCH corresponding to the PDCCH (S106).

After the above procedure, the UE may receive PDCCH/PDSCH from the eNB (S107) and may transmit a PUSCH/PUCCH to the eNB (S108), as a general uplink/downlink signal transmission procedure. Here, control information transmitted from the UE to the eNB is called uplink control information (UCI). The UCI may include a hybrid automatic repeat and request acknowledgement/negative-ack (HARQ ACK/NACK) signal, scheduling request (SR), channel state information (CSI), etc. The CSI includes a channel quality indicator (CQI), a precoding matrix indicator (PMI), rank indication (RI), etc. While the UCI is transmitted through a PUCCH in general, it may be transmitted through a PUSCH when control information and traffic data need to be simultaneously transmitted. The UCI may be aperiodically transmitted through a PUSCH according to the request/instruction of a network.

Figure 2:
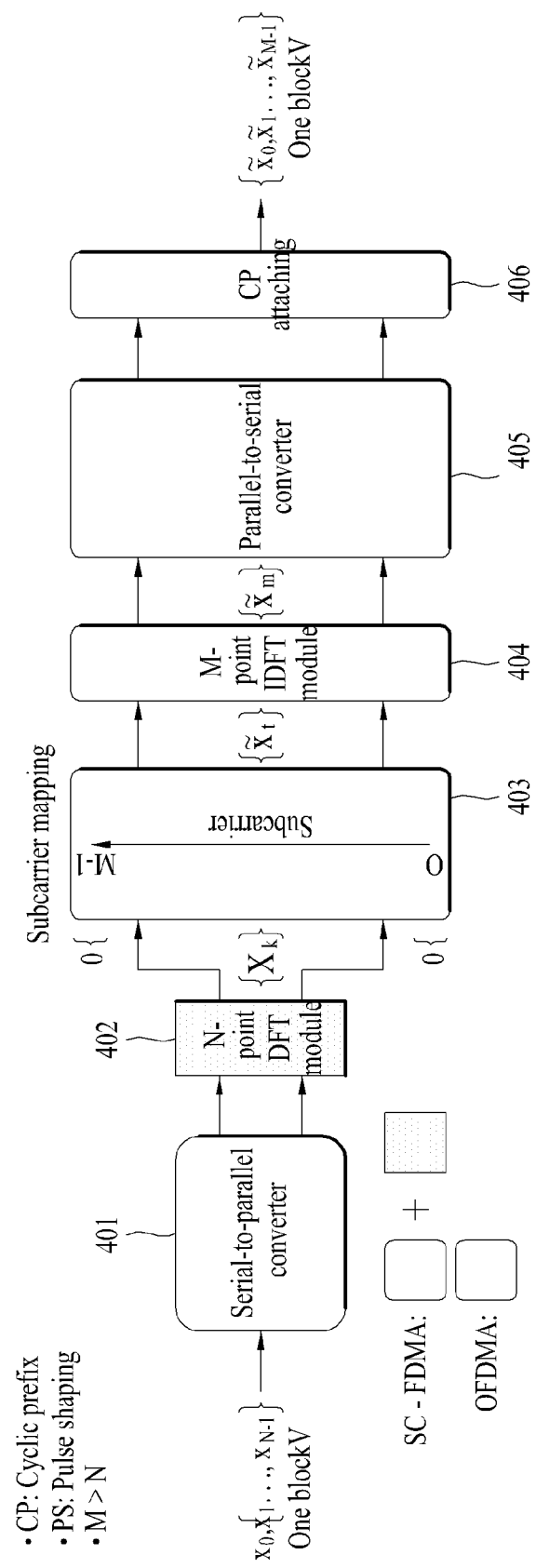
FIG. 2 is a diagram for explanation of a single carrier frequency division multiple access (SC-FDMA) method and an orthogonal frequency division multiple access (OFDMA) method.

FIG. 2 is a diagram for explanation of an SC-FDMA method and an OFDMA method. A 3GPP system adopts OFDMA for downlink and SC-FDMA for uplink.

Referring to FIG. 2, a UE for uplink signal transmission and a eNB for downlink signal transmission are the same in that both the UE and the eNB include a serial-to-parallel converter 401, a subcarrier mapper 403, an M-point IDFT module 404, and a CP attaching module 406. However, a UE for signal transmission via an SC-FDMA method further include an N-point DFT module 402. The N-point DFT module 402 may partly offset influence of IDFT processing of an M-point IDFT module 404 such that a transmitted signal has single subcarrier characteristics.

Figure 3:
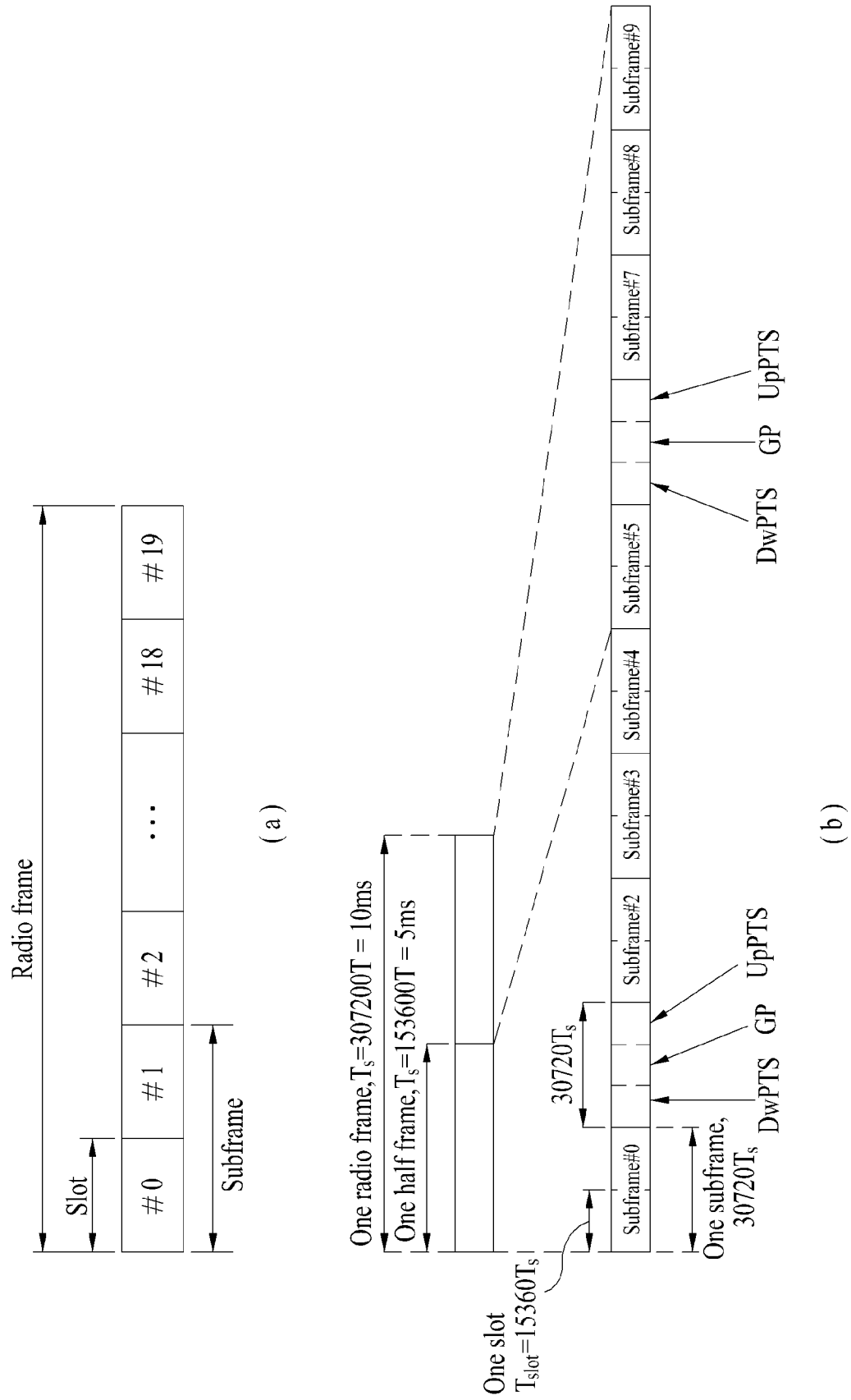
FIG. 3 is a diagram showing the structure of a radio frame.

FIG. 3 is a diagram showing the structure of a radio frame. Uplink/downlink data packets are transmitted in units of subframes. One subframe is defined as a predetermined time period including a plurality of OFDM symbols. LTE(-A) supports a type-1 radio frame structure applicable to frequency division duplex (FDD) and a type-2 radio frame structure applicable to time division duplex (TDD).

FIG. 3(*a*) illustrates the type-1 radio frame structure. A downlink/uplink radio frame is divided into 10 subframes. Each subframe is further divided into two slots in the time domain. For example, one subframe may be 1 ms in duration and one slot may be 0.5 ms in duration. A slot includes a plurality of OFDM symbols (or SC-FDMA symbols) in the time domain and a plurality of resource blocks (RBs) in the frequency domain. The LTE(-A) system adopts OFDMA for downlink and SC-FDMA for uplink. An RB is a resource allocation unit including a plurality of contiguous subcarriers in one slot.

FIG. 3(b) illustrates the type-2 radio frame structure. A type-2 radio frame includes two half frames, each having 5 subframes. Each subframe is divided into two slots. In a TDD mode, a subframe in a radio frame is configured as D, U, or S according to uplink-downlink (UL-DL) configuration. Here, D denotes a downlink subframe, U denotes an uplink subframe, and S denotes a special subframe. The special subframe includes downlink pilot timeslot (DwPTS), guard period (GP), and uplink pilot timeslot (UpPTS). The DwPTS is a period reserved for downlink transmission and the UpPTS is a period reserved for uplink transmission.

Figure 4:
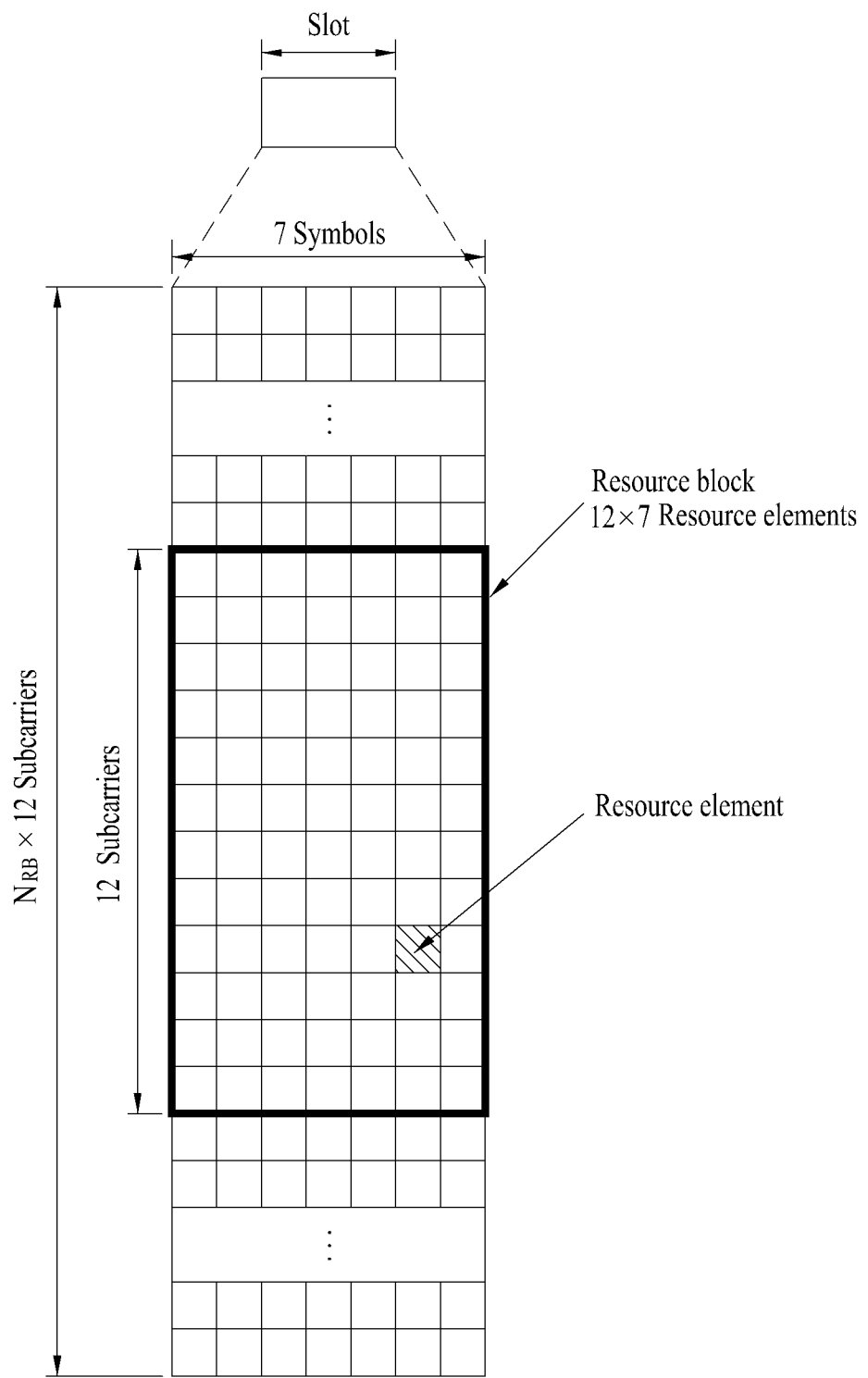
FIG. 4 illustrates a resource grid of a downlink slot.

FIG. 4 illustrates a resource grid of a downlink slot.

Referring to FIG. 4, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols are replaced by SC-FDMA symbols.

Figure 5:
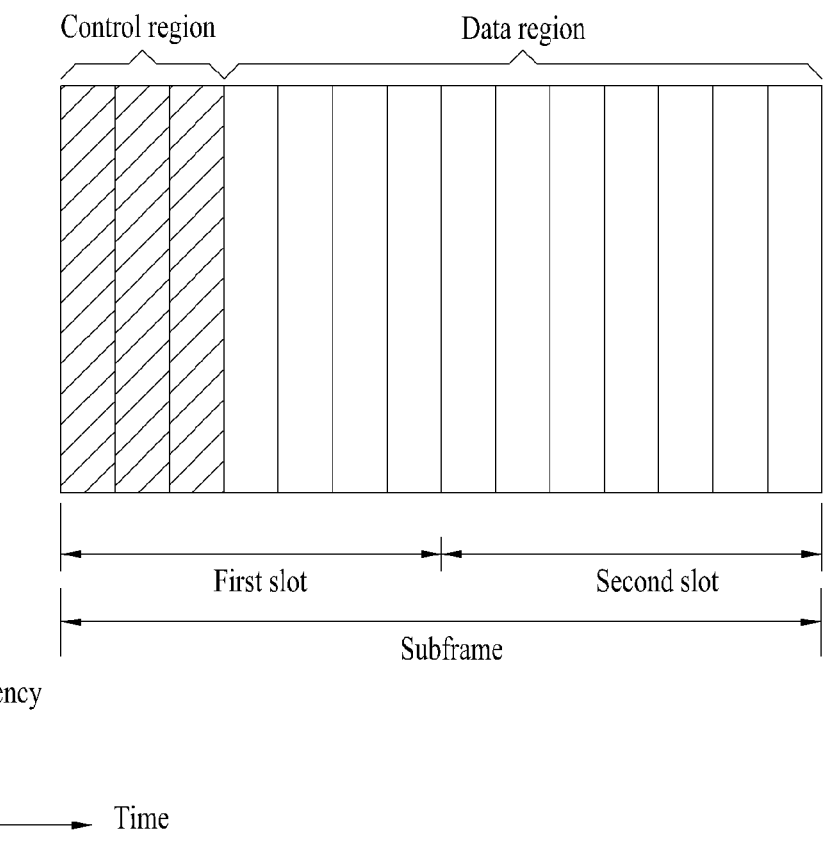
FIG. 5 illustrates a downlink subframe structure.

FIG. 5 illustrates a downlink subframe structure.

Referring to FIG. 5, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. The HARQ-ACK refers to a reception response result for downlink transmission (e.g., physical downlink shared channel (PDSCH) or semi-persistent scheduling release physical downlink control channel (SPS release PDCCH), that is, ACK/NACK/DTX response (simply, ACK/NACK response, ACK/NACK, A/N response, and A/N). The A/N refers to ACK, NACK, DTX, or NACK/DTX. The PDSCH may be replaced by a transport block or a codeword.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, modulation coding scheme (MCS), redundancy version (RV), new data indicator (NDI), transmit power control (TPC), cyclic shift for demodulation reference signal (DMRS), channel quality information (CQI) request, HARQ process number, transmitted precoding matrix indicator (TPMI), precoding matrix indicator (PMI), etc. confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The eNB determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

As described above, in the LTE system, an FDD DL carrier and TDD DL subframes use first n OFDM symbols of a subframe for transmission of a PDCCH, a PHICH, a PCFICH, etc. as a physical channel for transmission of various pieces of control information and use the remaining OFDM symbols for PDSCH transmission. In each subframe, the number of symbols used for control channel transmission is dynamically transmitted to a UE through a physical channel such as a PCFICH, etc. or is semi-statically transmitted to the UE via RRC signaling. n may be set up to four symbols from one symbol according to subframe characteristics and system characteristics (FDD/TDD, a system bandwidth, etc.). In the legacy LTE system, there is a limit in that a PDCCH as a physical channel for DL/UL scheduling and transmission various pieces of control information is transmitted through limited OFDM symbols. Thus, the LTE-A system additionally introduces an enhanced PDCCH (E-PDCCH) that is more freely multiplexed in PDSCH and FDM manners.

Figure 6:
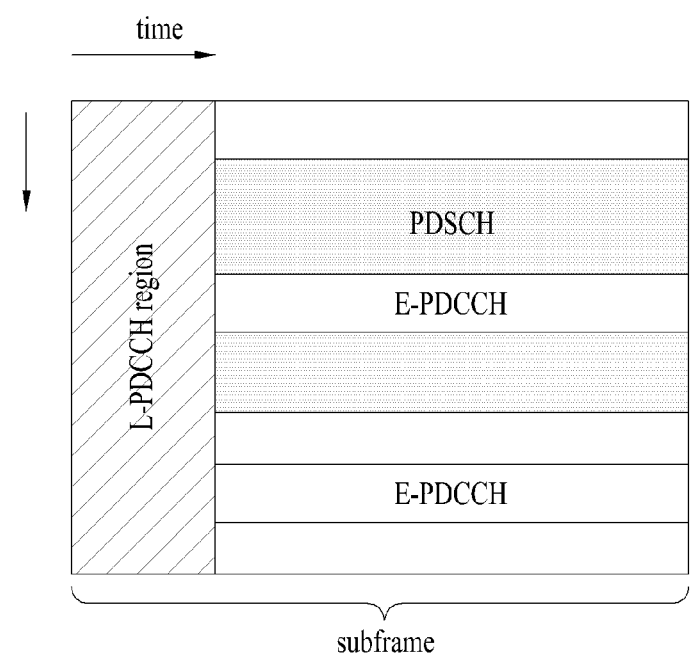
FIG. 6 illustrates an example in which a physical downlink control channel (PDCCH) is allocated to a data region of a subframe.

FIG. 6 illustrates an example in which a downlink physical channel is allocated to a subframe.

Referring to FIG. 6, a PDCCH (for convenience, legacy PDCCH and L-PDCCH) according to the legacy LET may be allocated to a control region (refer to FIG. 5) of a subframe. In FIG. 6, the L-PDCCH region refers to a region to which the legacy PDCCH can be allocated. According to the context, the L-PDCCH region may refer to a control region, a control channel resource region (i.e., CCE resource) to which a PDCCH can be actually allocated in the control region, or a PDCCH search space. A PDCCH in a data region (e.g., a resource region for a PDSCH, refer to FIG. 5) can be additionally allocated. The PDCCH allocated to a data region is referred to as an E-PDCCH. As illustrated in FIG. 6, a control channel resource can be additionally ensured through an E-PDCCH so as to alleviate scheduling restraints due to a limited control channel resource of the L-PDCCH region.

Like an L-PDCCH, an E-PDCCH carriers DCI. For example, the E-PDCCH may carrier downlink scheduling information and uplink scheduling information. The E-PDCCH/PDSCH procedure and the E-PDCCH/PUSCH procedure are the same/similar to those described with reference to steps S107 and S108 of FIG. 1. That is, the UE may receive an E-PDCCH and receive data/control information through a PDSCH corresponding to the E-PDCCH. In addition, the UE may receive the E-PDCCH and transmit data/control information through a PUSCH corresponding to the E-PDCCH. The legacy LTE adopts a method for pre-reserving a PDCCH candidate region (hereinafter, a PDCCH search space) in a control region and transmitting a PDCCH of a specific UE to a portion of the PDCCH search space. Accordingly, the UE may acquire a PDCCH of the UE in the PDCCH search space via blind decoding. Similarly, the E-PDCCH may also be partially or entirely transmitted over the pre-reserved resource.

Figure 7:
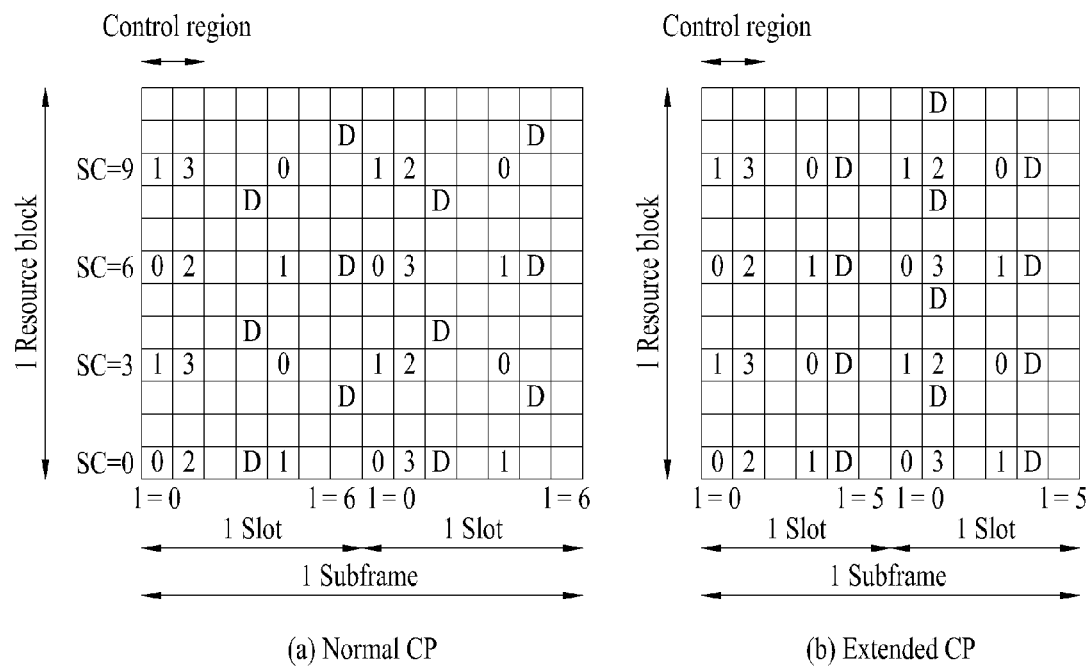
FIG. 7 illustrates a downlink reference signal (RS) pattern.

FIG. 7 illustrates a downlink reference signal (RS) pattern of an LTE system.

Referring to FIG. 7, in the LTE system, two types of downlink RSs are defined for unicast services. Common RSs (CRS) R0 to R3 for acquisition of information regarding channel state and measurement of handover and a UE-specific CRS 'D' for data demodulation are present. A UE-specific RS is referred to as a dedicated RS (DRS). The UE-specific RS is used only for data demodulation and the CRS is used both for acquisition of channel information and data demodulation. The CRS is a cell-specific signal and is transmitted every subframe through a whole band. The LTE system supports a maximum of 4 transmission antennas for downlink, and thus a CRS for a maximum of 4 antenna ports can be transmitted according to the number of transmission antennas. A CRS for each antenna port is multiplexed in an RB using a frequency division multiplexing (FDM) method.

A set of some of all subframes may be configured as a multicast broadcast single frequency network (MBSFN) subframe. The MBSFN subframe is a subframe configured for transmission of multicast/broadcast signals. The MBSFN subframe may be periodically configured. In the case of MBSFN subframe, a CRS is transmitted through only first and second OFDM symbols, and a UE that is not configured with an MBSFN service may disregard a data region or may not receive the data region.

Figure 8:
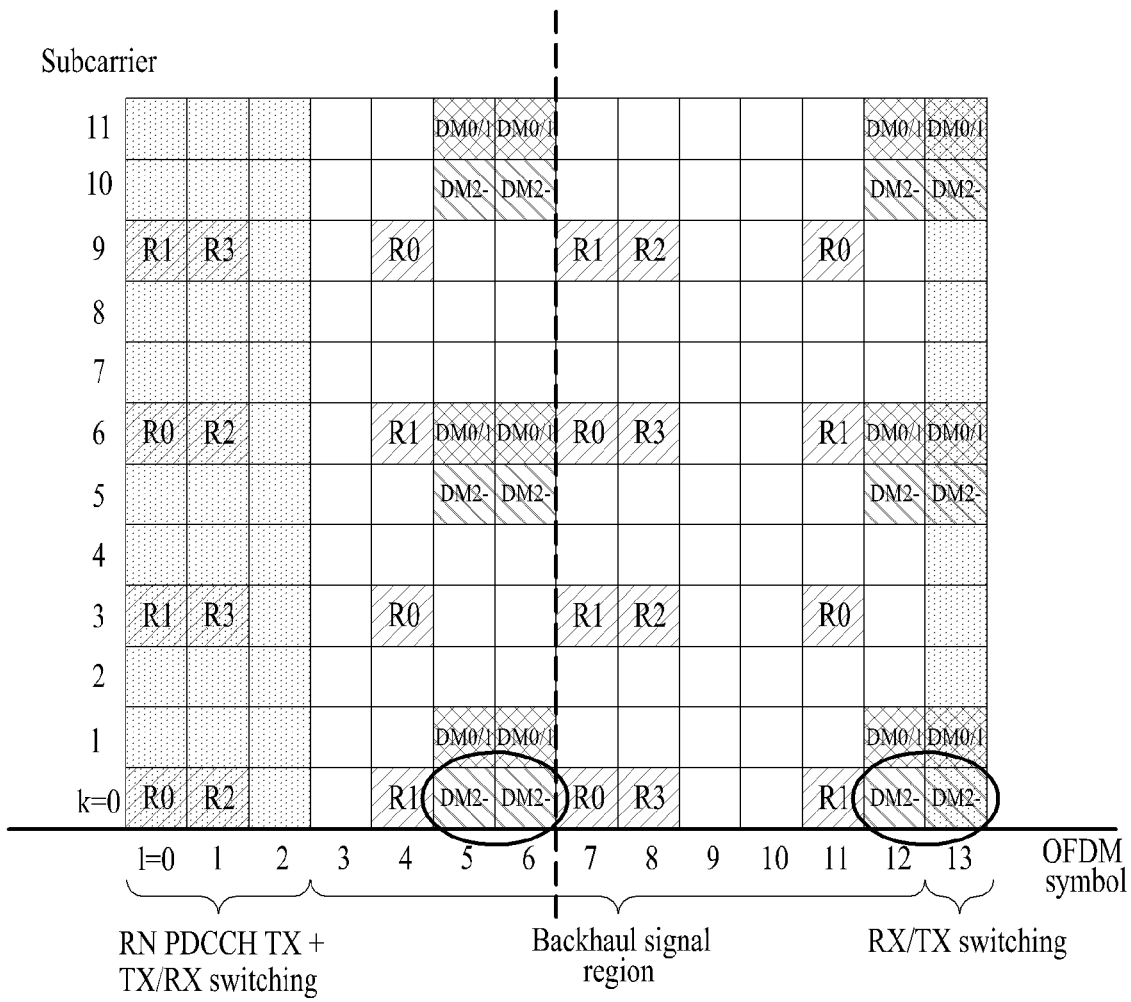
FIG. 8 illustrates a structure of a demodulation reference signal (DMRS) (or a UE-specific RS) structure.

FIG. 8 illustrates a structure of a DMRS added to an LTE-A system. The DMRS is a UE-specific RS used for demodulation of a signal of each layer when a signal is transmitted using a multiple antenna. The DMRS is used for PDSCH demodulation. The LTE-A system considers a maximum of 8 transmission antennas, and thus a maximum of 8 layers and respective DM-RSs therefor are required.

Referring to FIG. 8, DMRSs for two or more layers share the same RE and are multiplexed using a code division multiplexing (CDM) method. In detail, a DM-RS for each layer is spread using a spreading code (e.g., an orthogonal code such as Walsh code and DFT code) and then multiplexed on the same RE. For example, DMRSs for layers 0 and 1 share the same RE. The DMRSs are spread using an orthogonal code in two REs of OFDM symbols #12 and #13 in a subcarrier #1 (k=1), for example. That is, in each slot, DMRS for layers 0 and 1 are spread along the time axis using a code with a spreading factor (SF)=2 and then multiplexed on the same RE. For example, the DMRS for a layer #0 can be spread using [+1 +1] and the DMRS for a layer #1 can be spread using [+1 −1]. Similarly, DMRSs for layers #2 and #3 are spread using different orthogonal codes on the same RE. DMRSs for layers #4, #5, #6 and #7 are spread on REs occupied by DMRSs #0, #1, #2 and #3 using a code orthogonal to layers #0, #1, #2 and #3. A code with SF=2 is used for up to 4 layers and a code with SF=4 is used for DMRS for 5 or more layers. Antenna ports for DMRS correspond to {7, 8, . . . , n+6} (n being the number of layers).

Figure 9:
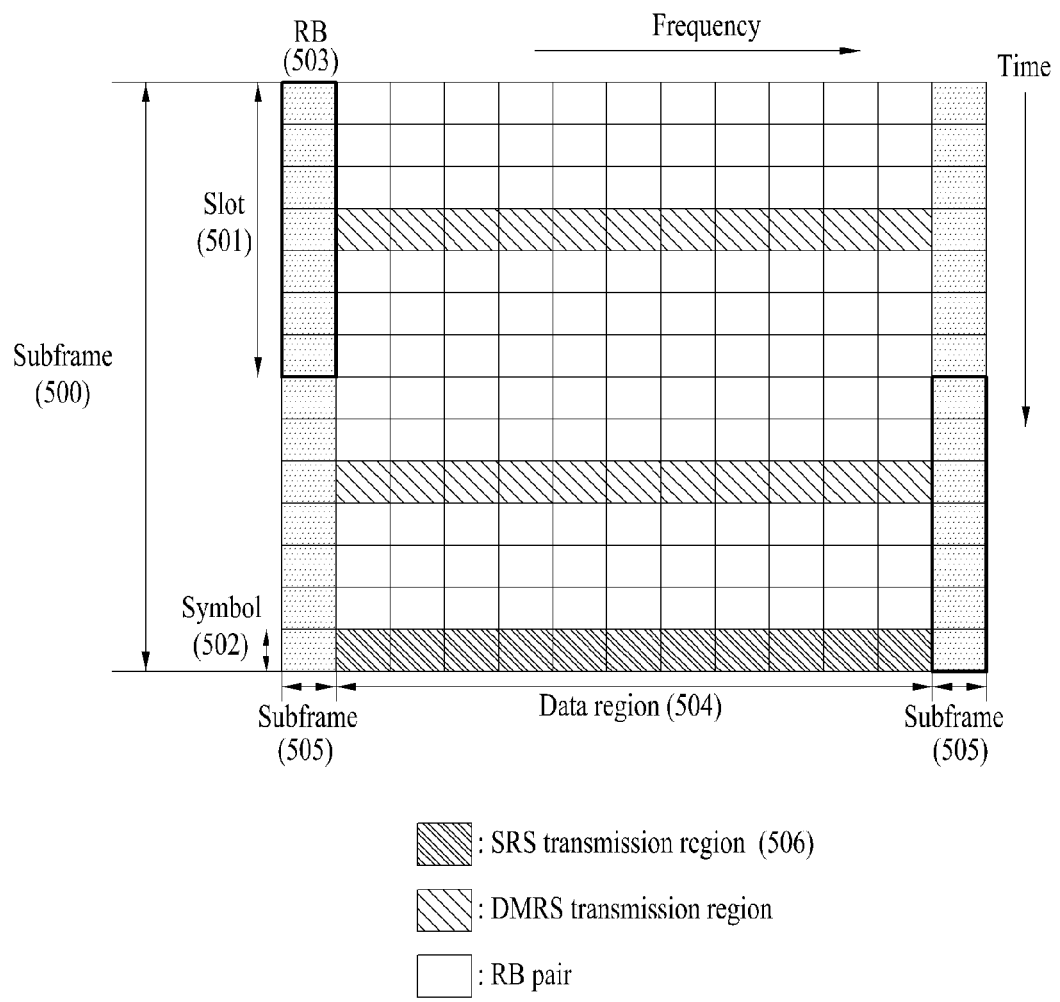
FIG. 9 illustrates a structure of an uplink subframe.

FIG. 9 illustrates a structure of an uplink subframe used in LTE(-A).

Referring to FIG. 9, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences.

Hereinafter, hybrid automatic repeat request (HARQ) will be described. In a wireless communication system, when a plurality of UEs having data to be transmitted in uplink/downlink is present, an eNB selects a UE to which data is to be transmitted every transmission time interval (TTI) (e.g., subframe). In a multicarrier system and a system managed in a similar way thereto, an eNB selects UEs to which data is to be transmitted in uplink/downlink every TTI and also selects a frequency band used for data transmission by the corresponding UE.

In terms of uplink, UEs transmits an RS (or pilot) in uplink and an eNB recognizes a channel state of the UEs using the RS transmitted from the UEs and selects UEs to which data is to be transmitted in uplink in each unit frequency band every TTI. The eNB notifies a UE of this result. That is, the eNB transmits an uplink assignment message indicating that data is to be transmitted using a specific frequency band to a UE that is uplink-scheduled to a specific TTI. The uplink assignment message is also referred to as UL grant. The UE transmits data in uplink according to the uplink assignment message. The uplink assignment message may include a UE identify (ID), RB allocation information, a modulation and coding scheme (MCS), a redundancy version (RV), new data indication (NDI), etc.

In the case of a synchronous non-adaptive HARQ method, retransmission time is systemically determined (e.g., after 4 subframes from an NACK reception point of time). Thus, a UL grant message transmitted to a UE by an eNB is transmitted only at initial transmission and next retransmission is performed by ACK/NACK signals (e.g., a PHICH signal). On the other hand, in the case of asynchronous adaptive HARQ method, retransmission time is not determined, and thus the eNB needs to transmit a retransmission request message to the UE. In addition, an MCS or a frequency resource for retransmission is varied every transmission time, and thus the retransmission request message may include a UE ID, RB allocation information, an HARQ process index, RV, and NDI information.

Figure 10:
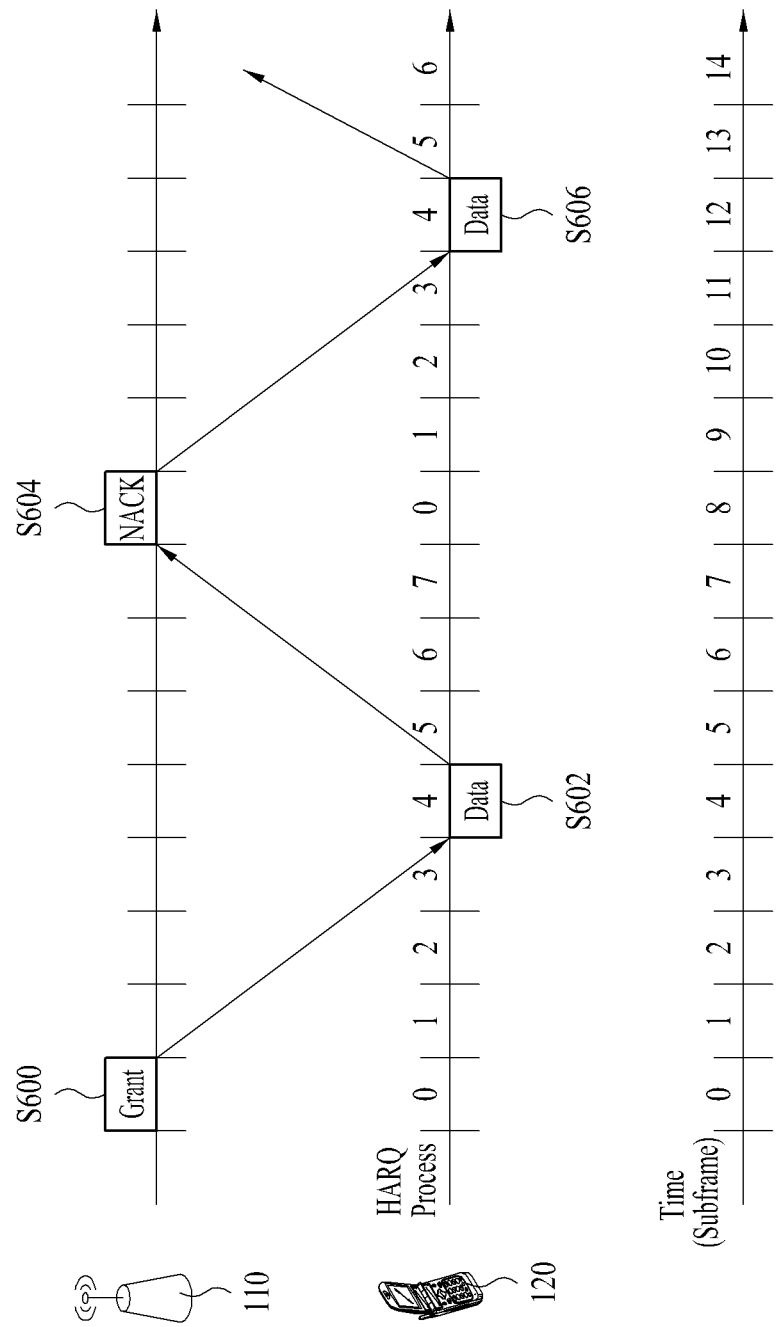
FIG. 10 illustrates a uplink hybrid automatic repeat request (UL HARQ) operation.

FIG. 10 illustrates a UL HARQ operation in an LTE(-A) system. In the LTE(-A) system, a UL HARQ method uses synchronous non-adaptive HARQ. When 8 channel HARQ is used, an HARQ process number is given as 0 to 7. One HARQ process is operated every TTI (e.g., subframe). Referring to FIG. 10, an eNB 110 transmits UL grant to a UE 120 through a PDCCH (S600). The UE 120 transmits uplink data to the eNB 110 using an MCS and an RB determined by UL grant after four subframes (e.g., subframe #4) from reception point of time of the UL grant (S602). The eNB 110 decodes uplink data received from the UE 120 to generate ACK/NACK. Upon failing to decode the uplink data, the eNB 110 transmits NACK to the UE 120 (S604). The UE 120 retransmits uplink data after four subframes from a reception point of time of NACK (S606). Initial transmission and retransmission of uplink data are performed by the same HARQ processor (e.g., HARQ process 4). ACK/NACK information may be transmitted through a PHICH.

Embodiment

Figure 11:
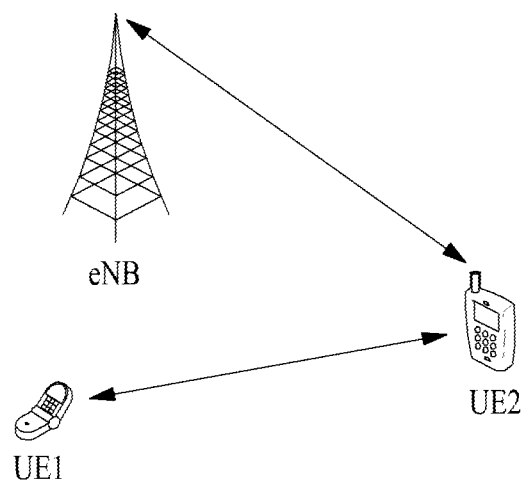
FIG. 11 illustrates a system for supporting device-to-device (D2D) link.

FIG. 11 illustrates a wireless communication system for supporting device-to-device (D2D) communication. In the case of legacy LTE and LTE-A systems, UEs are scheduled from an eNB for communication between the UEs and also perform a series of processes for transmitting and receiving data through the eNB. On the other hand, (although control from the eNB is also partially performed,) a communication scheme for transmitting and receiving directly to and from the UE without passing through the eNB is referred to as D2D communication or UE-UE communication. Referring to FIG. 11, in a user plane, UE2 may perform direct communication with UE1 without passing through a network (e.g., an eNB) (UE-UE communication/link). In addition, in the user plane, UE2 may perform communication with another UE through an eNB according to a conventional method (UE-eNB link/communication).

Hereinafter, the present invention proposes a scheduling process for D2D communication and D2D resource allocation performed together therewith, and a D2D signal modulation and demodulation scheme.

For convenience, a device for performing a D2D data transmission operation on D2D communication link is referred to as a transmission device (TD) and a device for performing a D2D data reception operation is referred to as a receiving device (RD). Unless mentioned otherwise, in the present invention, a PDCCH include both a legacy L-PDCCH and an E-PDCCH and can be interpreted according to the context.

(1) Scheduling Procedure for D2D Communication

FIG. 12 illustrates the case in which a scheduling procedure for D2D communication, in detail, scheduling for D2D communication is performed with intervention of an eNB according to an embodiment of the present invention. Referring to FIG. 12, the eNB may provide information and/or a parameter required for D2D communication to UEs (e.g., UE1 and UE2) configured to perform D2D communication ((a) ① and (b) ①). Then actual scheduling for D2D communication may include two types of methods. A first method is similar to a conventional DL scheduling method, TD (UE1) may transmit information required for scheduling to RD (UE2) ((a)②) and transmit D2D data corresponding thereto ((a)③). A second method is similar to a conventional UL scheduling method, TD(UE1) may receive information required for scheduling from RD (UE2) ((b)②) and transmit D2D data corresponding thereto ((b)③). Although not illustrated, a process ② may be omitted from the illustrated method according to a method of embodiment. That is, the eNB may provide all pieces of information and/or parameters required for D2D communication ((①)) and TD may transmit D2D data corresponding thereto to RD (UE2) ((③)).

In FIG. 12, the scheduling procedure may be varied according to a level (e.g., semi-statically or dynamically) of various pieces of information and/or parameters required for D2D communication, which are provided to TD/RD from the eNB, a level (e.g., only resource allocation is signaled or all pieces of scheduling information are signaled) at which the eNB intervenes in D2D communication, and a level (e.g., through PDCCH/PDSCH or via other signaling) at which control overhead is applied to D2D scheduling. The present invention proposes the three following D2D scheduling methods.

Method (a): D2D Scheduling using PDSCH

In this method, an eNB may transmit D2D scheduling information to TD/RD using a PDSCH (hereinafter, D2D-sch PDSCH). The D2D scheduling information may include at least a portion of, for example, TD identification (ID), RD ID, resource allocation (RA), modulation and coding scheme (MCS), transport block (TB) size, transmission power control (TPC) command, and A/N resource information. Here, the RA may include information about D2D data transmission resource and may further include information (e.g., subframe offset/index) associated with a point of time when a D2D data transceiving operation is performed. Here, the subframe offset for D2D data transceiving may be applied based on an RA reception subframe (index). In addition, the A/N resource information may include A/N transmission resource information about D2D reception and may further include information (e.g., subframe offset/index) associated with a point of time of A/N feedback transmission for D2D reception. Here, the subframe offset for A/N transmission may be applied based on a D2D data transceiving subframe (index) or an RA receiving subframe (index).

In this example, a D2D-sch PDSCH and a PDCCH for scheduling the same may be detected/decoded by a plurality of (potential) D2D UEs. To this end, the corresponding PDCCH may be scrambled based on an RNTI (for convenience, referred to as D2D-RNTI) that is commonly allocated to a plurality of D2D UEs. In this case, a PDSCH may include D2D scheduling information for a plurality of UEs. For example, the D2D scheduling information for a plurality of UEs may be transmitted through a medium access control (MAC) protocol data unit (PDU). In this case, the MAC PDU may include a MAC header and a MAC payload, the MAC header may include a plurality of MAC sub-headers, and the MAC payload may include a plurality of pieces of D2D scheduling information corresponding to the MAC sub-headers. Each MAC sub-header may include a D2D UE ID (e.g., TD ID and RD ID).

As another method, an eNB may notify TD/RD of SF set information (and/or MCS/TB size) for making/allowing D2D signal transmission through a PDSCH, and actual D2D scheduling information such as RA (and/or MCS/TB size), etc. may be signaled (i.e., the eNB transmits DL grant to the UE for DL data scheduling) to RD by TD through a specific SF in the corresponding D2D SF set. In this case, the D2D data may be transmitted to RD from TD through an SF in which corresponding D2D scheduling information is signaled or a specific SF thereafter.

As another method, an eNB may notify TD/RD of SF set information (and/or MCS/TB size) for making/allowing D2D signal transmission through a PDSCH, and actual D2D scheduling information such as RA (and/or MCS/TB size), etc. may be signaled (i.e., the eNB transmits UL grant to the UE for UL data scheduling) to TD by RD through a specific SF in the corresponding D2D SF set. In this case, assuming that an SF in which the D2D scheduling information is signaled is SF #n, the D2D data may be transmitted to RD from TD through SF #(n+k0) or a specific SF (e.g., a first SF of an SF set) thereafter (e.g., k0 is a positive integer (e.g., k0≥4) and for example, k0=4).

This method may be appropriate for a situation in which a burden for overhead and resource use for D2D scheduling is low or a dynamic/adoptive change for resource and parameter required for D2D data transmission is required.

Method (b): D2D Scheduling using 2-Step PDCCH

In this case, an eNB may transmit primary D2D scheduling information (hereinafter, D2D schd-info-1) to TD/RD using (i) PDCCH or (ii) PDSCH (similarly to the above method (a)). Here, a PDCCH for scheduling the corresponding PDCCH or the corresponding PDSCH may be scrambled based on common RNTI (e.g., D2D-RNT). Then TD may transmit secondary D2D scheduling information (hereinafter, D2D schd-info-2) to RD using a specific control signal/channel (e.g., a control signal/channel of a similar form to PDCCH) based on the D2D schd-info-1, and TD may transmit corresponding D2D data to RD. In this case, corresponding D2D data may be transmitted to RD from TD through an SF in which D2D scheduling information is signaled or a specific SF thereafter. As another method, RD may transmit D2D schd-info-2 to TD using a specific control signal/channel (e.g., a control signal/channel of a similar form to PDCCH) based on the D2D schd-info-1 and then TD may transmit corresponding D2D data to RD. In this case, assuming that D2D schd-info-2 is transmitted in SF #n, D2D data transmission to RD from TD may be performed in SF #(n+k0) or a specific SF thereafter (e.g., k0 is a positive integer (e.g., k0≥4) and for example, k0=4).

Here, the D2D schd-info-1 may include (all or some of) limited information such as TD ID, RD ID, RA-1, A/N resource information, etc. Here, the RA-1 may provide allocation information about a larger resource region (which may include an entire system BW) than a (frequency) resource used for actual D2D data transmission. In addition, the RA-1 may further include D2D data/control signal transceiving time information. In addition, the D2D schd-info-2 may include (all or some of) limited information such as RA-2, MCS/TB size, TPC command, etc. Here, the RA-2 may provide allocation information about a resource to be used for actual D2D data transmission in a resource region (e.g., a frequency resource region) allocated by the RA-1. To this end, a D2D UE may consider a resource region allocated by the RA-1 as an entire band for D2D communication and may newly number a resource index, etc. for D2D communication according to the result. By considering the allocated resource region as an entire region for D2D communication, a bit number required for resource allocation can be reduced.

That is, a control signal/channel (e.g., PDCCH-2) including D2D schd-info-2 may be transmitted through a resource region allocated by RA-1 and D2D data may be transmitted through a resource (which is present in a resource region allocated by the RA-1) allocated by RA-2 in D2D schd-info-2. Here, PDCCH-2 and D2D data may be TDMed (to a symbol level or an SF level similarly to L-PDCCH/PDSCH) on a subframe and/or FDMed (similarly to E-PDCCH/PDSCH or PUCCH/PUSCH) and transmitted. As another method, the RA-1 may transmit only D2D data/control signal transceiving point of time (time) information and the RA-2 may allocate D2D data transceiving (frequency) resource information at a corresponding point of time.

This method, for example, may be appropriate for a scenario that an eNB may allocate only a predetermined resource region/time for D2D communication while the eNB cannot recognize transmission link state (e.g., CSI) between TD-versus-RD, and actual D2D scheduling (RA/MCS/TPC, etc. for D2D data transmission) and transmission is autonomously performed by TD/RD.

Method (c): D2D Scheduling using Trigger

In this method, an eNB may (semi-statically) pre-configure D2D scheduling control information to D2D UEs using a higher layer signaling (such as radio resource control (RRC)/medium access control (MAC), etc.) and may (dynamically) transmit a control signal/channel (hereinafter, referred to as D2D trigger) for triggering D2D communication to TD/RD at a specific point of time. Here, the D2D trigger may have a PDCCH form based on the same/similar format to DCI format (e.g., 3/3A) for UL PC (power control) and DCI format (e.g., 0/1A) for DL/UL grant or may reuse a PHICH (for A/N response for PUSCH transmission) for D2D trigger. Here, the PDCCH used for the D2D trigger may be scrambled based on a common RNTI (e.g., D2D-RNTI).

When the D2D trigger has a PDCCH form for grant, D2D scheduling control information configured via a higher layer signaling may include (all or some of) RA, A/N resource information (+MCS/TB size), etc. and the D2D trigger may include only (all or some of) limited information such as TD/RD ID, TPC command (+MCS/TB size), etc. When the D2D trigger has a PHICH or PDCCH form for PC, D2D scheduling control information configured via a higher layer signaling may include all of RA, MCS/TB size, A/N resource information, etc., and the D2D trigger may have only a function indicating whether D2D communication is triggered and whether TD/RD is on or off In detail, a case of D2D trigger based on a PDCCH for a PC will be exemplified. The PDCCH for the PC includes power control information of a plurality of UEs and power control information for each UE may be provided using a bit value corresponding to each UE. Thus, in the case of D2D trigger based on the PDCCH for the PC, it may be considered that 2 bits in one PDCCH scrambled based on specific D2D-RNTI are configured as a flag indicating whether TD/RD are, for example, ON/OFF respectively, or one bit in each PDCCH scrambled based on two different D2D-RNTIs is configured as a flag indicating whether TD or RD is on or off respectively. When both TD/RD are OFF, it may be considered that D2D communication is not triggered. In addition, in the case of D2D trigger using a PHICH, two different PHICH resources may be configured as a flag indicating whether TD/RD is on or off A/N modulation on each PHICH resource may be used for ON/OFF signaling.

As another method, an eNB may perform D2D triggering at a specific point of time while SF set information (and/or MCS/TB size) for making/allowing D2D signal transmission is pre-configured for TD/RD via a higher layer signaling. In this case, actual D2D scheduling information such as RA (and/or MCS/TB size), etc. may be signaled (i.e., the eNB transmits DL grant to the UE for DL data scheduling) to RD by TD through a specific SF in the D2D SF set. Corresponding D2D data may be transmitted to RD from TD though an SF through an SF in which D2D scheduling information is signaled or a specific SF thereafter.

As another method, an eNB may perform D2D triggering at a specific point of time while SF set information (and/or MCS/TB size) for making/allowing D2D signal transmission is pre-configured for TD/RD via a higher layer signaling. In this case, actual D2D scheduling information such as RA (and/or MCS/TB size), etc. may be signaled (i.e., the eNB transmits DL grant to the UE for UL data scheduling) to TD by RD through a specific SF in the D2D SF set. Assuming that an SF in which the D2D scheduling information is signaled is SF #n, the corresponding D2D data may be transmitted to RD from TD through SF #(n+k0) or a specific SF (e.g., a first SF of an SF set) thereafter (e.g., k0 is a positive integer (e.g., k0≥4) and for example, k0=4).

In this method, this method may be appropriate for a situation in which change in D2D data transmission resources and parameters is relatively intermittent or a burden for overhead and resource use for D2D scheduling is high.

(2) Resource Allocation Method for D2D Communication

As described above, it may be considered that, during D2D communication, an eNB explicitly notifies TD/RD of information associated with D2D data transmission time and/or A/N feedback transmission time for D2D reception through a PDCCH, etc. However, whenever D2D communication is performed, if the information associated with the D2D data transmission time and/or the A/N feedback transmission time for D2D reception are dynamically signaled, overhead may be caused. Blind decoding (BD) may be increased due to increase in DCI format size. In addition, when feedback for D2D reception is NACK, if the eNB transmits D2D scheduling control information for retransmission of D2D data, overhead may also be caused. To prevent this, RD may transmit A/N feedback to TD and reuse automatic retransmission timing in legacy 3GPP Rel-10 without changes. However, in general, since A/N feedback transmission to an eNB is not performed in D2D communication, when a conventional retransmission method is used without changes, the eNB cannot know when D2D data transmission is successful, and thus the eNB need to continuously empty a retransmission resource instead of allocating the retransmission resource to another UE. Accordingly, when a conventional retransmission method is used in D2D communication without changes, problems may arise in that a scheduling restriction to other UEs (that do not participate in D2D communication) becomes more serious. In addition, D2D data/feedback transmission time may need to be shared by other (potential) D2D) UEs as well as TD/RD that actually perform D2D communication (e.g., in order to allow detection/measurement/report, etc. of D2D signal and interference).

Accordingly, the present invention proposes that D2D data (and/or control signal) and a potential D2D candidate SF set (i.e., a D2D SF set) in which feedback transmission is to be performed are configured (via a higher layer signaling such as broadcast/RRC, etc.).

FIG. 13 illustrates a D2D communication procedure according to an embodiment of the present invention. Referring to FIG. 13, a UE (UE N or UE M) that participate in D2D communication may receive D2D subframe set allocation information from a BS (S1302). That is, a plurality of SF sets (e.g., an SF set for UE-BS communication and one or more SF set for D2D communication) may be configured for a D2D UE, and the D2D UE may transmit and receive a D2D signal in an SF set for D2D communication (S1304).

In detail, a common D2D SF set or a separate D2D SF set may be configured for D2D data transmission and reception (to RD from TD) (and/or D2D scheduling information signaling/detection (to RD from TD or to TD from RD)) and D2D reception A/N feedback (to TD from RD). That is, an SF for D2D data transmission and reception (and/or D2D scheduling information transmission and reception) and an SF set for A/N feedback may be the same or may be independently configured. The SF for D2D data transmission and reception (and/or D2D scheduling information transmission and reception) and the SF set for A/N feedback may partially overlap each other. Alternatively, the SF for D2D data transmission and reception, the SF set for D2D scheduling information transmission and reception, and the SF set for A/N feedback may be entirely or partially the same or may be independently configured. The SF for D2D data transmission and reception, the SF set for D2D scheduling information transmission and reception, and the SF set for A/N feedback may entirely or partially overlap each other. In addition, for configuration of a D2D SF set, a cell-specific D2D SF set (a hatching box) including a potential D2D SF of all D2D UEs in a cell may be present, and a specific subset in a cell-specific D2D SF set may be configured as a UE-specific D2D SF set constituting a D2D candidate SF of each UE (a hatching box with a bold outline).

Meanwhile, in the legacy 3GPP Rel-10, a specific SF may be intentionally configured for MBSFN, a legacy UE may be intentionally faked to perform an operation such as detection/measurement, etc. of a main signal (e.g., CRS) and a channel (e.g., a PDCCH) only in a limited small number (1 and 2) OFDM symbol periods of a front portion of a corresponding SF, and then UE-specific DMRS-based DL data transmission support for providing more enhanced performance may be considered for an advanced UE through the remaining periods except for the corresponding symbol period. Accordingly, the present invention proposes that an entire or partial portion of an MBSFN SF (set) is configured (used) as the D2D candidate SF (set). In this case, it may be possible to limit a main detection/measurement operation of another UE (which is a legacy UE or a UE that does not participate in D2D) within a limited small number of symbol periods and to configure D2D communication (data/feedback) link without serious interference/error due to D2D signals through the remaining periods.

FIG. 14 illustrates a D2D communication procedure according to an embodiment of the present invention. FIG. 14 illustrates a procedure of transmitting D2D data and feedback based on a D2D SF set.

Referring to FIG. 14, when TD/RD receives D2D scheduling control information (using a method such as PDSCH/PDCCH and D2D trigger, etc. for the D2D scheduling triggering) from an eNB in SF #n (e.g., SF #2) (S1402), D2D data (and/or D2D scheduling information including corresponding RA (and/or MCS/TB size), etc.) may be transmitted to RD from TD through SF # (n+k1) or a next closest D2D SF (i.e., SF #m (e.g., SF #4)) (for data transmission). Then when RD receives D2D data from TD in SF #m (e.g., SF #4), A/N feedback therefor may be transmitted to TD/eNB from RD through SF # (m+k2) (e.g., SF #(4+4)) or a next closest D2D SF (i.e., SF #h (e.g., SF #16)) (for A/N feedback). Then when TD receives NACK from RD in SF #h (e.g., SF #16), D2D data corresponding thereto may be retransmitted through SF # (h+k3) (e.g., SF #(16+4)) or a next closest D2D SF (for data transmission). Here, k1 to k3 may be a positive integer (e.g., k1=k2=k3≥4) and for example, k1=k2=k3=4.

As another method, it may be possible to configure D2D scheduling information signaling performed through SF #m and a D2D data transmission corresponding to the D2D scheduling information signaling as follows. First, RD may signal D2D scheduling information including RA (and/or MCS/TB size), etc. to TD in SF #m and TD may transmit D2D data corresponding to corresponding information to RD in next SF #(m+k5) or next closest D2D SF #m1 (e.g., k5 is a positive integer (e.g., k5≥4) and for example, k5=4).

Meanwhile, it may be possible to request information such as RA (and/or MCS/TB size), etc. and (preferred) SF appropriate to apply D2D data transmission directly to an eNB by TD and/or RD (which relatively well recognizes D2D link state/quality).

In addition, an independent D2D discovery SF set may be configured (via a higher layer signaling such as broadcast/RRC, etc.) in order to perform only detection/measurement/report of D2D signal and interference (or on a subset of a corresponding SF set) separately from D2D data (and/or a control signal) and a D2D SF set for feedback. In this case, similarly, when a control signal/channel indicating detection/measurement of D2D signal and interference is received through SF #g, detection/measurement of D2D signal and interference may be performed through SF # (g+k4) or a next closest D2D discovery SF (k4 is a positive integer (e.g., k4≥0)). Alternatively, upon receiving a control signal/channel indicating transmission of a D2D discovery signal through SF #g (in order to discover a corresponding specific D2D UE by other D2D UEs), a specific D2D UE may transmit the D2D discovery signal through SF #(g+k6) or a next closest D2D discovery SF (e.g., k6 is a positive integer (e.g., k6≥4) and for example, k6=4).

In addition, in order to ensure discovery performance for a D2D signal of an entire D2D UE group that performs D2D communication, a UE may omit/abandon transmission of a periodic signal/channel (e.g., a periodic SRS, a PUCCH for transmission of periodic CSI, a PUCCH for transmission of an SR, and a PUSCH scheduled in an SPS manner) which is set/reserved to be transmitted in a D2D discovery SF set and/or a PUSCH that is automatically retransmitted (non-adaptively based on only PHICH NACK) through the corresponding D2D discovery SF set. In addition, the UE may operate on an assumption that the UE does not expect grant (e.g., UL grant for scheduling PUSCH transmission) and/or a command (e.g., a PDCCH order for command of RACH preamble transmission) for scheduling a signal/channel to be transmitted in a D2D discovery SF set and/or grant (e.g., DL grant for scheduling PDSCH transmission) causing HARQ-ACK PUCCH transmission in a D2D discovery SF set or an assumption that they are not transmitted. For example, the UE may omit a DL grant PDCCH reception process for an SF, HARQ-ACK transmission timing of which corresponds to the D2D discovery SF set, or may disregard or may not decode a PDSCH corresponding to a PDCCH even if the UE receives the DL grant PDCCH. Meanwhile, the UE may omit a UL grant PDCCH reception process for an SF, PUSCH transmission timing of which corresponds to the D2D discovery SF set, or may perform a reception process on a UL grant PDCCH and drop PUSCH transmission when a PUSCH transmission point of time corresponding to a UL grant PDCCH is included in a D2D discovery SF set.

Alternatively, conversely, upon detecting/receiving grant and/or command for scheduling a signal/channel to be transmitted in a specific D2D discovery SF and/or grant causing HARQ-ACK PUCCH transmission in a specific D2D discovery SF, a UE may omit D2D signal detection/measurement in the corresponding specific D2D discovery SF and can operate while assuming/considering the corresponding SF as a normal SF that is not set as a D2D discovery SF.

The aforementioned signal/channel processing procedure can also be applied in the same/similar way to a D2D SF set that is set for D2D data transmission and reception and/or D2D scheduling information transmission and reception and/or D2D reception A/N feedback.

(3) Modulation and Demodulation Method for D2D Communication

A UE for supporting a D2D operation may further include an OFDM transmitting module and/or an SC-FDM receiving module for D2D communication according to category/capability as well as an OFDM receiving module and an SC-FDM transmitting module for communication with an eNB. When hardware specification (e.g., the characteristics of a power amplifier) is sufficiently stable, D2D communication link that operates based on OFDM transmission and reception can be more effective. In addition, like prior art, it may be necessary to support D2D communication for a low-specification UE configured with only an OFDM receiving/SC-FDM transmitting module.

Hereinafter, a method for configuring/determining a data modulation and demodulation method for D2D signal transmission and reception will be proposed. First, a UE may notify an eNB of information (e.g., fast Fourier transform (FFT) size) about added specification (OFDM transmitting/SC-FDM receiving module) for D2D use in addition to basic specification (OFDM receiving/SC-FDM transmitting module). In this case, an applicable bandwidth (BW) of the added OFDM transmitting/SC-FDM receiving module may be smaller than an applicable BW of the basic OFDM receiving/SC-FDM transmitting module. In detail, whether OFDM modulation and demodulation (e.g., a PDSCH, or PDCCH/PDSCH when transmission of scheduling control information is also considered on D2D link like in (b) above) or SC-FDM modulation and demodulation (e.g., PUSCH, or PUCCH/PUSCH when transmission of scheduling control information is also considered on D2D link like in (b) above) is applied for D2D data transmission and reception on D2D communication link may be set cell-specifically or UE-specifically via broadcast/RRC/L1(Layer 1)/L2(Layer 2) signaling, etc. In addition, in the above method, it may be possible to indicate a modulation and demodulation method in D2D trigger and PDSCH/PDCCH for triggering D2D scheduling. In addition, it may be possible to apply an OFDM modulation and demodulation method when a PDCCH for D2D triggering is based on DCI format for DL grant and to apply an SC-FDM modulation and demodulation method when a PDCCH for D2D triggering is based on DCI format for UL grant. In addition, it may be possible to apply an OFDM modulation and demodulation method when performance of transmission and reception of D2D data is indicated through a DL SF and to apply an SC-FDM modulation and demodulation method when performance of transmission and reception of D2D data is indicated through a UL SF.

CP configuration information for D2D signal transmission may be set via broadcast/RRC/L1/L2 signaling or indicated through PDSCH/PDCCH and D2D trigger for D2D scheduling triggering. For example, the CP configuration information may indicate CP length information, for example, whether normal/extended CP, and/or a specific CP (e.g., CP shorter than normal CP) added dedicatedly for D2D.

In addition, start/end time information (e.g., a symbol position/index for start/end of D2D signal transmission in the corresponding SF) of D2D signal transmission in a D2D (discovery) SF may be set via broadcast/RRC/L1/L2 signaling or indicated via PDSCH/PDCCH and D2D trigger for D2D scheduling triggering. For example, assuming that symbol indexes in one SF are configured as being 0 to K, a symbol index n and m in the D2D (discovery) SF may be set/indicated as start/end point of time of D2D signal transmission (0≤n≤K, 0≤m≤K, and n<m). In consideration of transmission and reception operation switching time (i.e., switching time) and/or propagation delay of a (relatively short) D2D transmission signal that may be different from link between an eNB and a UE, when n is set as a specific value or less (e.g., 0), transmission and reception of all or (last) some of symbols of an SF immediately before the corresponding D2D SF may be limited/omitted. For the same reason, when m is set as a specific value or more (e.g., K), transmission and reception of all or (first) some of symbols of an SF immediately before the corresponding D2D SF may be limited/omitted.

In addition, when D2D transmission and reception is performed through a DL SF, a D2D data/control signal may be rate-matched for an OFDM symbol or a resource element (RE) that includes or can include transmission of common reference signal (CRS)/channel state information reference signal (CSI-RS) and/or demodulation reference signal (DMRS) between an eNB and (another) UE. In addition, when D2D transmission and reception is performed through a UL SF, the D2D data/control signal may be rate-matched for an SC-FDM symbol or an RE that includes or can include transmission of a sounding reference signal (SRS) and/or DMRS. In addition, when D2D transmission and reception is performed through a DL/UL SF, DMRS for D2D signal reception/demodulation may be arranged so as not to overlap with DMRS in 3GPP Rel-10 on the time axis and/or frequency axis in order to prevent interference with other UEs (which communicate with an eNB). For example, in the case of normal CP based UL SF in 3GPP Rel-10, DMRS for PUSCH is arranged in a fourth SC-FDM symbol in each slot. In this regard, when D2D data transmission and reception based on SC-FDM modulation and demodulation is performed through the corresponding UL SF, DMRS for D2D may be arranged in, for example, a third or fifth SC-FDM symbol (among the remaining symbols except for the fourth symbol) in each slot. In addition, considering that D2D data transmission and reception can be mainly performed between UEs with low mobility, DMRS for D2D signal reception/demodulation can be formed in such a way that some symbols are omitted in the DMRS structure in 3GPP Rel-10. For example, in the case of normal CP based UL SF in 3GPP Rel-10, one SC-FDM symbol in each slot is arranged as DMRS for PUSCH. In this regard, when D2D data transmission and reception based on SC-FDM modulation and demodulation is performed through the corresponding UL SF, DMRS for D2D may be arranged only in one specific slot (e.g., first or second slot).

In a D2D scheduling method in addition to the above proposals, D2D scheduling control information (which is transmitted through PDSCH/PDCCH, D2D trigger, etc. or is previously set via RRC, etc.) may include D2D data transmission/retransmission allowance duration and SF set, allowance transmission/retransmission number of times (i.e., maximum reTx), etc. The TD/RD that receives them may transmit/retransmit D2D data by a number of times corresponding to the corresponding maximum reTx only in the corresponding duration/SF set. In this case, the RD may transmit A/N feedback for D2D data reception to an eNB (i.e., A/N-to-eNB) or the TD (A/N-to-TD). When all of the duration/SF set/maximum reTx are not used, if the RD successfully receives D2D (i.e., A/N feedback is ACK), information (e.g., corresponding A/N feedback) about this may be signaled to the TD from the eNB (in the case of A/N-to-eNB) or to the eNB from the TD (in the case of A/N-to-TD). As such, the TD can reuse an SF that is not used in the received duration/SF set/maximum reTx for communication with the eNB. In addition, the eNB can reallocate the SF that is not used in the duration/SF set/maximum reTx to another UE. In the above case, when the transmission/retransmission allowance SF set is indicated, SFs in the corresponding set may be configured with an appropriate time interval (i.e., so as to sequentially perform D2D transmission=>A/N feedback=>corresponding information signaling=>D2D retransmission) in consideration of latency used for related information signaling and A/N feedback.

Figure 15:
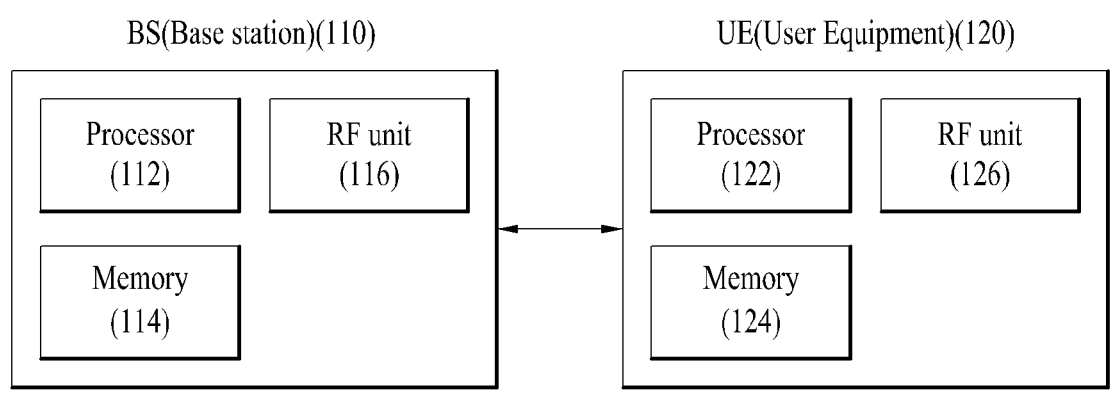
FIG. 15 illustrates a base station and a user equipment (UE) to which an embodiment of the present invention is applicable.

FIG. 15 illustrates a BS 110 and a UE 120 to which an embodiment of the present invention is applicable. In the case of a system including a relay, the BS 110 or the UE 120 may be replaced by the relay. In UE-UE link, the illustrated BS-UE may be replaced by UE-UE.

Referring to FIG. 15, a wireless communication system includes the BS 110 and the UE 120. The BS 110 includes a processor 112, a memory 114, and a radio frequency (RF) unit 116. The processor 112 may be configured to embody the procedures and/or methods proposed by the present invention. The memory 114 is connected to the processor 112 and stores various pieces of information associated with an operation of the processor 112. The RF unit 116 is connected to the processor 112 and transmits and/or receives a radio signal. The UE 120 includes a processor 122, a memory 124, and an RF unit 126. The processor 122 may be configured to embody the procedures and/or methods proposed by the present invention. The memory 124 is connected to the processor 122 and stores various pieces of information associated with an operation of the processor 122. The RF unit 126 is connected to the processor 122 and transmits and/or receives a radio signal. The BS and/or the UE 120 may each have a single antenna or a multiple antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a Base Station (BS) and a User Equipment (UE). A specific operation described as performed by the BS may be performed by an upper node of the BS. Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'access point (AP)', etc. In addition, the term 'terminal' may be replaced with the term 'UE', 'mobile station (MS)', 'mobile subscriber station (MSS)', 'subscriber station (SS)', etc.

The embodiments of the present invention may be achieved by various means, for example, hardware, firmware, software, or a combination thereof In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a user equipment (UE), a relay, a base station (BS), etc.

The invention claimed is:

1. A method for transmitting Device-to-Device (D2D) data by a first user equipment (UE) in a wireless communication system, the method comprising:
   receiving, by the first UE, a Radio Resource Control (RRC) message including Subframe (SF) set allocation information from a base station, the SF set allocation information indicating non-contiguous SF sets for D2D communication;
   receiving, by the first UE, a first Physical Downlink Control Channel (PDCCH) including primary D2D scheduling information from the base station in a subframe #n, wherein n is an integer of 0 or more;
   transmitting, by the first UE, a second PDCCH including secondary D2D scheduling information to a second UE using the primary D2D scheduling information; and
   transmitting, by the first UE, the D2D data to the second UE using the secondary D2D scheduling information, in a first available one of the non-contiguous SF sets for D2D communication after a subframe #(n+k1), wherein k1>0.

2. The method according to claim 1, wherein a Cyclic Redundancy Check (CRC) of the first PDCCH is scrambled with a common Radio Network Temporary Identifier (RNTI) for D2D.

3. The method according to claim 1, wherein a frequency resource indicated by the secondary D2D scheduling information is allocated on an assumption that a frequency resource indicated by the primary D2D scheduling information is an entire frequency resource for D2D communication.

4. The method according to claim 3, wherein the primary D2D scheduling information indicates a plurality of frequency resource indexes, and the plurality of frequency resource indexes are renumbered for the secondary D2D scheduling information.

5. The method according to claim 4, wherein a field size of the secondary D2D scheduling information is smaller than a field size of the primary D2D scheduling information.

6. A first user equipment (UE) configured to perform Device-to-Device (D2D) operations in a wireless communication system, the first UE comprising:
   a radio frequency (RF) unit configured to transmit and receive a radio signal; and
   a processor operably coupled with the RF unit and configured to:
      receive a Radio Resource Control (RRC) message including Subframe (SF) set allocation information from a base station, the SF set allocation information indicating non-contiguous SF sets for D2D communication,
      receive a first Physical Downlink Control Channel (PDCCH) including primary D2D scheduling information from the base station in a subframe #n, wherein n is an integer of 0 or more,
      transmit a second PDCCH including secondary D2D scheduling information to a second UE using the primary D2D scheduling information, and
      transmit the D2D data to the second UE using the secondary D2D scheduling information, in a first available one of the non-contiguous SF sets for D2D communication after a subframe #(n+k1), wherein k1>0.

7. The first UE according to claim 6, wherein a Cyclic Redundancy Check (CRC) of the first PDCCH is scrambled with a common Radio Network Temporary Identifier (RNTI) for D2D.

8. The first UE according to claim 6, wherein a frequency resource indicated by the secondary D2D scheduling information is allocated on an assumption that a frequency resource indicated by the primary D2D scheduling information is an entire frequency resource for D2D communication.

9. The first UE according to claim 8, wherein the primary D2D scheduling information indicates a plurality of frequency resource indexes, and the plurality of frequency resources indexes are renumbered for the secondary D2D scheduling information.

10. The first UE according to claim 8, wherein a field size of the secondary D2D scheduling information is smaller than a field size of the primary D2D scheduling information.

* * * * *